United States Patent
Quan et al.

(10) Patent No.: US 11,246,140 B2
(45) Date of Patent: Feb. 8, 2022

(54) CORE NETWORK ACCESSING METHOD, BASE STATION, AND USER EQUIPMENT

(71) Applicant: CHINA ACADEMY OF TELECOMMUNICATIONS TECHNOLOGY, Beijing (CN)

(72) Inventors: Haiyang Quan, Beijing (CN); Jing Liang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 91 days.

(21) Appl. No.: 16/635,915

(22) PCT Filed: Jun. 19, 2018

(86) PCT No.: PCT/CN2018/091799
§ 371 (c)(1),
(2) Date: Jan. 31, 2020

(87) PCT Pub. No.: WO2019/024617
PCT Pub. Date: Feb. 7, 2019

(65) Prior Publication Data
US 2020/0236682 A1 Jul. 23, 2020

(30) Foreign Application Priority Data
Aug. 3, 2017 (CN) .......................... 201710656723.0

(51) Int. Cl.
*H04W 72/04* (2009.01)
*H04W 76/27* (2018.01)
*H04W 84/04* (2009.01)

(52) U.S. Cl.
CPC ..... *H04W 72/0493* (2013.01); *H04W 72/042* (2013.01); *H04W 76/27* (2018.02); *H04W 84/042* (2013.01)

(58) Field of Classification Search
CPC ............. H04W 72/0493; H04W 76/27; H04W 72/042; H04W 84/042; H04W 36/14;
(Continued)

(56) References Cited

U.S. PATENT DOCUMENTS

| 2010/0027468 | A1 | 2/2010 | Rajadurai et al. |
| 2015/0208293 | A1* | 7/2015 | Zhang ............... H04W 36/0077 455/433 |
| 2019/0021048 | A1* | 1/2019 | Kadiri ................... H04W 76/11 |

FOREIGN PATENT DOCUMENTS

| CN | 1761353 A | 4/2006 |
| EP | 2613596 A1 | 1/2012 |
| WO | 2019014354 A1 | 1/2019 |

OTHER PUBLICATIONS

3GPP TSG-RAN WG2 #97bis—Tdoc R2-1702561, CN selection when accessing, Apr. 3-7, 2017, Ericsson (Year: 2017).*
(Continued)

*Primary Examiner* — Farid Seyedvosoghi
(74) *Attorney, Agent, or Firm* — Ladas & Parry, LLP

(57) ABSTRACT

The core network accessing method includes: transmitting PLMN indication information about a base station to a UE, the PLMN indication information including information about PLMNs connected to a core network of a first type and information about PLMNs connected to a core network of a second type; receiving information about a target PLMN selected by the UE in accordance with the PLMN indication information and matching the UE, and determining a target core network to be accessed in accordance with the information about the target PLMN; and interacting with the target core network and the UE, so as to enable the UE to access the target core network via the target PLMN.

18 Claims, 5 Drawing Sheets

(58) Field of Classification Search
CPC ..... H04W 48/12; H04W 48/18; H04W 48/16; H04W 48/08; H04W 88/06; H04W 84/12
See application file for complete search history.

(56) References Cited

OTHER PUBLICATIONS

3GPP TSG-RAN WG2 #98—R2-1705709, Network selection for initial access in E-UTRA connected to 5GC, May 15-19, 2017, Huawei, Hisilicon (Year: 2017).*
3rd Generation Partnership Project; Technical Specification Group Radio Access Network; Evolved Universal Terrestrial Radio Access (E-UTRA); Radio Resource Control (RRC); Protocol specification , (Release 14); 3GPP TS 36.331 V14.3.0 (Jun. 2017).
"CN selection when accessing", R2-1702561, 3GPP TSG-RAN WG2 #97bis, Spokane, USA, Apr. 3-7, 2017.
"Inter-system and inter-RAT mobility for LTE connected to 5G-CN", R2-1704178, 3GPP TSG-RAN WG2 #98, Hangzhou, P.R. of China, May 15-19, 2017.
"Network selection for initial access in E-UTRA connected to 5GC", R2-1705709, 3GPP TSG-RAN WG2 #98, Hangzhou, P.R. of China, May 15-19, 2017.
"Multi-PLMN aspects of E-UTRA cell connected to 5GC", R2-1710420 (revision of R2-1708151), 3GPP TSG-RAN WG2 Meeting #99 bis, Prague, Czech, Oct. 9-13, 2017.
Extended European Search Report from EP app. No. 18842266.1, dated Jul. 13, 2020.
International Search Report from PCT/CN2018/091799, dated Aug. 21, 2018, with English translation from WIPO.
Written Opinion from the International Searching Authority from PCT/CN2018/091799, dated Aug. 21, 2018, with English translation from WIPO.
International Preliminary Report on Patentability from PCT/CN2018/091799, dated Feb. 4, 2020, with English translation from WIPO.

* cited by examiner

US 11,246,140 B2

CORE NETWORK ACCESSING METHOD, BASE STATION, AND USER EQUIPMENT

CROSS-REFERENCE TO RELATED APPLICATIONS

The present application is the U.S. national phase of PCT Application No. PCT/CN2018/091799 filed on Jun. 19, 2018, which claims priority to the Chinese application No. 201710656723.0 filed on Aug. 3, 2017, the disclosures of which are incorporated herein by reference in their entireties.

TECHNICAL FIELD

The present disclosure relates to the field of communication technology, in particular to a core network accessing method, a base station and a UE.

BACKGROUND

For a Long Term Evolution (LTE) system, with the development from 4th-Generation (4G) to 5th-Generation (5G), there exists such a scenario where an enhanced LTE (eLTE) base station is capable of being connected to both a 4G core network and a 5G core network.

There exist the following three types of network architecture for the eLTE base station.

As a first type, the eLTE base station is merely connected to an Evolved Packet Core (EPC), i.e., the 4G core network. Architecture of the core network is the same as that defined in TS36.300.

FIG. 1 shows architecture of an Evolved Universal Mobile Telecommunications System (UMTS) Terrestrial Radio Access Network (E-UTRAN). The E-UTRAN consists of evolved Node Bs (eNBs). Each eNB has an access network function, and communicates with a UE via an air interface. There are both a control plane connection and a user plane connection between the UE and the eNB. For each UE attached to the network, services are provided by a Mobility Management Entity (MME) to the UE, and the MME is connected to the eNB via an S1-MME interface. Control plane services, including a mobility management function and a bearer management function, are provided to the UE via the S1-MME interface.

A Serving Gateway (S-GW) is connected to the eNB via an S1-U interface. For each UE attached to the network, services are provided by one S-GW to the UE. User plane services are provided to the UE via the S1-U interface, and user plane data for the UE is transmitted between the S-GW and the eNB via the S1-U interface.

As a second type, as shown in FIG. 2, the eLTE base station is simultaneously connected to network architecture including two core networks, i.e., the EPC and the 5G core network (5GC).

As a third type, as shown in FIG. 3, the eLTE base station is merely connected to the 5GC.

For the network architecture in FIG. 2, the eLTE base station is connected to the two core networks, and it is necessary for the UE to select one of the core networks when the UE accesses the network. However, there is currently no definite scheme for solving this problem.

SUMMARY

An object of the present disclosure is to provide a core network accessing method, a base station, and a UE. The base station may transmit information about a Public Land Mobile Network (PLMN) connected to a core network of a first type and information about a PLMN connected to a core network of a second type to the UE, and then the UE may select a target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

In one aspect, the present disclosure provides in some embodiments a core network accessing method, including: transmitting PLMN indication information about a base station to a UE, the PLMN indication information including information about PLMNs connected to a core network of a first type and information about PLMNs connected to a core network of a second type; receiving information about a target PLMN selected by the UE in accordance with the PLMN indication information and matching the UE, and determining a target core network to be accessed in accordance with the information about the target PLMN; and interacting with the target core network and the UE, so as to enable the UE to access the target core network via the target PLMN.

In some possible embodiments of the present disclosure, the transmitting the PLMN indication information about the base station to the UE includes transmitting a first PLMN list and a second PLMN list to the UE. The first PLMN list includes the PLMNs connected to the core network of the first type, and the second PLMN list includes the PLMNs connected to the core network of the second type.

In some possible embodiments of the present disclosure, the transmitting the PLMN indication information about the base station to the UE includes transmitting a third PLMN list, first indication information about the third PLMN list, and a fourth PLMN list to the UE. The third PLMN list includes PLMNs merely connected to the core network of the first type and PLMNs connected to both the core network of the first type and the core network of the second type. The first indication information is used to indicate whether each PLMN in the third PLMN list is connected to the core network of the second type. The fourth PLMN list includes PLMNs merely connected to the core network of the second type.

In some possible embodiments of the present disclosure, the PLMN indication information further includes preferential core network indication information indicating a preferential core network for each PLMN connected to the core network of the first type and the core network of the second type, and the preferential core network is the core network of the first type or the core network of the second type.

In some possible embodiments of the present disclosure, the PLMN indication information further includes a Tracking Area Code (TAC) for each PLMN and/or a cell Identity (ID) for each PLMN.

In some possible embodiments of the present disclosure, when the target PLMN is connected to both the core network of the first type and the core network of the second type, the information about the target PLMN includes second indication information indicating that the target PLMN is connected to the core network of the first type and the core network of the second type. The receiving the information about the target PLMN selected by the UE in accordance with the PLMN indication information and matching the UE and determining the target core network to be accessed in accordance with the information about the target PLMN includes: receiving the information about the target PLMN selected by the UE in accordance with the PLMN indication information and matching the UE, and third indication information indicating whether the UE needs to access the core network of the second type; and determining the target core network to be accessed in accordance with the third indication information and the second indication information in the information about the target PLMN.

In some possible embodiments of the present disclosure, the core network accessing method further includes: receiving information about a preferential PLMN supported by the UE and a preferential core network from the UE, the preferential core network being the core network of the first type or the core network of the second type; and when the UE moves out of a coverage of the base station, selecting, by the base station, a target base station supporting the preferential PLMN and the preferential core network, and notifying the target base station to configure resources for the UE, so as to enable the UE to be connected to the target base station.

In another aspect, the present disclosure provides in some embodiments a core network access method, including: receiving PLMN indication information about a base station from the base station, the PLMN indication information including information about PLMNs connected to a core network of a first type and information about PLMNs connected to a core network of a second type; selecting a target PLMN matching a UE in accordance with the PLMN indication information; and transmitting information about the target PLMN to the base station.

In some possible embodiments of the present disclosure, the receiving the PLMN indication information about the base station from the base station includes receiving a first PLMN list and a second PLMN list from the base station. The first PLMN list includes the PLMNs connected to the core network of the first type, and the second PLMN list includes the PLMNs connected to the core network of the second type.

In some possible embodiments of the present disclosure, the receiving the PLMN indication information about the base station from the base station includes receiving a third PLMN list, first indication information about the third PLMN list, and a fourth PLMN list from the base station. The third PLMN list includes PLMNs merely connected to the core network of the first type and PLMNs connected to both the core network of the first type and the core network of the second type. The first indication information is used to indicate whether each PLMN in the third PLMN list is connected to the core network of the second type. The fourth PLMN list includes PLMNs merely connected to the core network of the second type.

In some possible embodiments of the present disclosure, the PLMN indication information further includes preferential core network indication information indicating a preferential core network for each PLMN connected to the core network of the first type and the core network of the second type, and the preferential core network is the core network of the first type or the core network of the second type.

In some possible embodiments of the present disclosure, the PLMN indication information further includes a TAC for each PLMN and/or a cell ID for each PLMN.

In some possible embodiments of the present disclosure, when the target PLMN is connected to both the core network of the first type and the core network of the second type, the information about the target PLMN includes second indication information indicating that the target PLMN is connected to the core network of the first type and the core network of the second type. The transmitting the information about the target PLMN to the base station includes transmitting the information about the target PLMN including the second indication information and third indication information indicating whether the UE needs to access the core network of the second type to the base station.

In some possible embodiments of the present disclosure, the core network accessing method further includes reporting information about a preferential PLMN supported by the UE and a preferential core network to the base station, so that when the UE moves out of a coverage of the base station, the base station selects a target base station supporting the preferential PLMN and the preferential core network, and notifies the target base station to configure resources for the UE, so as to enable the UE to be connected to the target base station. The preferential core network is the core network of the first type or the core network of the second type.

In yet another aspect, the present disclosure provides in some embodiments a base station, including: an indication information transmission module configured to transmit PLMN indication information about the base station to a UE, the PLMN indication information including information about PLMNs connected to a core network of a first type and information about PLMNs connected to a core network of a second type; a target core network determination module configured to receive information about a target PLMN selected by the UE in accordance with the PLMN indication information and matching the UE, and determine a target core network to be accessed in accordance with the information about the target PLMN; and an access module configured to interact with the target core network and the UE, so as to enable the UE to access the target core network via the target PLMN.

In some possible embodiments of the present disclosure, the indication information transmission module includes a first transmission unit configured to transmit a first PLMN list and a second PLMN list to the UE. The first PLMN list includes the PLMNs connected to the core network of the first type, and the second PLMN list includes the PLMNs connected to the core network of the second type.

In some possible embodiments of the present disclosure, the indication information transmission module includes a second transmission unit configured to transmit a third PLMN list, first indication information about the third PLMN list, and a fourth PLMN list to the UE. The third PLMN list includes PLMNs merely connected to the core network of the first type and PLMNs connected to both the core network of the first type and the core network of the second type. The first indication information is used to indicate whether each PLMN in the third PLMN list is connected to the core network of the second type. The fourth PLMN list includes PLMNs merely connected to the core network of the second type.

In some possible embodiments of the present disclosure, the PLMN indication information further includes preferential core network indication information indicating a preferential core network for each PLMN connected to the core network of the first type and the core network of the second type, and the preferential core network is the core network of the first type or the core network of the second type.

In some possible embodiments of the present disclosure, the PLMN indication information further includes a TAC for each PLMN and/or a cell ID for each PLMN.

In some possible embodiments of the present disclosure, when the target PLMN is connected to both the core network of the first type and the core network of the second type, the information about the target PLMN includes second indication information indicating that the target PLMN is connected to the core network of the first type and the core network of the second type. The target core network determination module includes: an information reception unit configured to receive the information about the target PLMN selected by the UE in accordance with the PLMN indication information and matching the UE, and third indication information indicating whether the UE needs to access the core network of the second type; and a target core network determination unit configured to determine the target core network to be accessed in accordance with the third indication information and the second indication information in the information about the target PLMN.

In some possible embodiments of the present disclosure, the base station further includes: an information reception module configured to receive information about a preferential PLMN supported by the UE and a preferential core network from the UE, the preferential core network being the core network of the first type or the core network of the second type; and a target base station determination module configured to, when the UE moves out of a coverage of the base station, select a target base station supporting the preferential PLMN and the preferential core network, and notify the target base station to configure resources for the UE, so as to enable the UE to be connected to the target base station.

In still yet another aspect, the present disclosure provides in some embodiments a UE, including: an indication information reception module configured to receive PLMN indication information about a base station from the base station, the PLMN indication information including information about PLMNs connected to a core network of a first type and information about PLMNs connected to a core network of a second type; a PLMN selection module configured to select a target PLMN matching the UE in accordance with the PLMN indication information; and a feedback information transmission module configured to transmit information about the target PLMN to the base station.

In some possible embodiments of the present disclosure, the indication information reception module includes a first reception unit configured to receive a first PLMN list and a second PLMN list from the base station. The first PLMN list includes the PLMNs connected to the core network of the first type, and the second PLMN list includes the PLMNs connected to the core network of the second type.

In some possible embodiments of the present disclosure, the indication information reception module includes a second reception unit configured to receive a third PLMN list, first indication information about the third PLMN list, and a fourth PLMN list from the base station. The third PLMN list includes PLMNs merely connected to the core network of the first type and PLMNs connected to both the core network of the first type and the core network of the second type. The first indication information is used to indicate whether each PLMN in the third PLMN list is connected to the core network of the second type. The fourth PLMN list includes PLMNs merely connected to the core network of the second type.

In some possible embodiments of the present disclosure, the PLMN indication information further includes preferential core network indication information indicating a preferential core network for each PLMN connected to the core network of the first type and the core network of the second type, and the preferential core network is the core network of the first type or the core network of the second type.

In some possible embodiments of the present disclosure, the PLMN indication information further includes a TAC for each PLMN and/or a cell ID for each PLMN.

In some possible embodiments of the present disclosure, when the target PLMN is connected to both the core network of the first type and the core network of the second type, the information about the target PLMN includes second indication information indicating that the target PLMN is connected to the core network of the first type and the core network of the second type. The feedback information transmission module is further configured to transmit the information about the target PLMN including the second indication information and third indication information indicating whether the UE needs to access the core network of the second type to the base station.

In some possible embodiments of the present disclosure, the UE further includes an information reporting module configured to report information about a preferential PLMN supported by the UE and a preferential core network to the base station, so that, when the UE moves out of a coverage of the base station, the base station selects a target base station supporting the preferential PLMN and the preferential core network, and notifies the target base station to configure resources for the UE, so as to enable the UE to be connected to the target base station. The preferential core network is the core network of the first type or the core network of the second type.

In still yet another aspect, the present disclosure provides in some embodiments a base station, including a first memory, a first processor, and a computer program stored in the first memory and executed by the first processor. The first processor is configured to execute the computer program so as to implement the above-mentioned core network accessing method for the base station.

In still yet another aspect, the present disclosure provides in some embodiments a UE, including a first memory, a first processor, and a computer program stored in the first memory and executed by the first processor. The first processor is configured to execute the computer program so as to implement the above-mentioned core network accessing method for the UE.

In still yet another aspect, the present disclosure provides in some embodiments a computer-readable storage medium storing therein a computer program. The computer program is executed by a processor so as to implement the above-mentioned core network accessing method for the base station.

In still yet another aspect, the present disclosure provides in some embodiments a computer-readable storage medium storing therein a computer program. The computer program is executed by a processor so as to implement the above-mentioned core network accessing method for the UE.

The present disclosure at least has the following beneficial effect. According to the embodiments of the present disclosure, the base station may transmit the information about the PLMNs connected to the core network of the first type and the information about the PLMNs connected to the core network of the second type to the UE, and the UE may select the target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. In the following description, specific details of configurations and assemblies are merely provided to facilitate the understanding of the present disclosure. It should be appreciated that, a person skilled in the art may make further modifications and alternations without departing from the spirit of the present disclosure. In addition, for clarification, any known function and structure will not be described hereinafter.

It should be further appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be appreciated that, the following serial numbers do not refer to the order of the steps. Actually, the order shall be determined in accordance with functions and internal logic of the steps, but shall not be construed as limiting the implementation in any form.

In addition, the terms "system" and "network" may be replaced with each other.

It should be further appreciated that, the expression "B corresponding to A" means that B is related to A and may be determined in accordance with A. It should be further appreciated that, in the case that B is determined in accordance with A, it means that B may be determined in accordance with A and/or any other information.

An object of the present disclosure is to provide a core network accessing method, a base station and a UE, so as to solve the problem in the related art where it is impossible for the UE to select a to-be-accessed core network in the network architecture including two core networks.

First Embodiment

Figure 1:
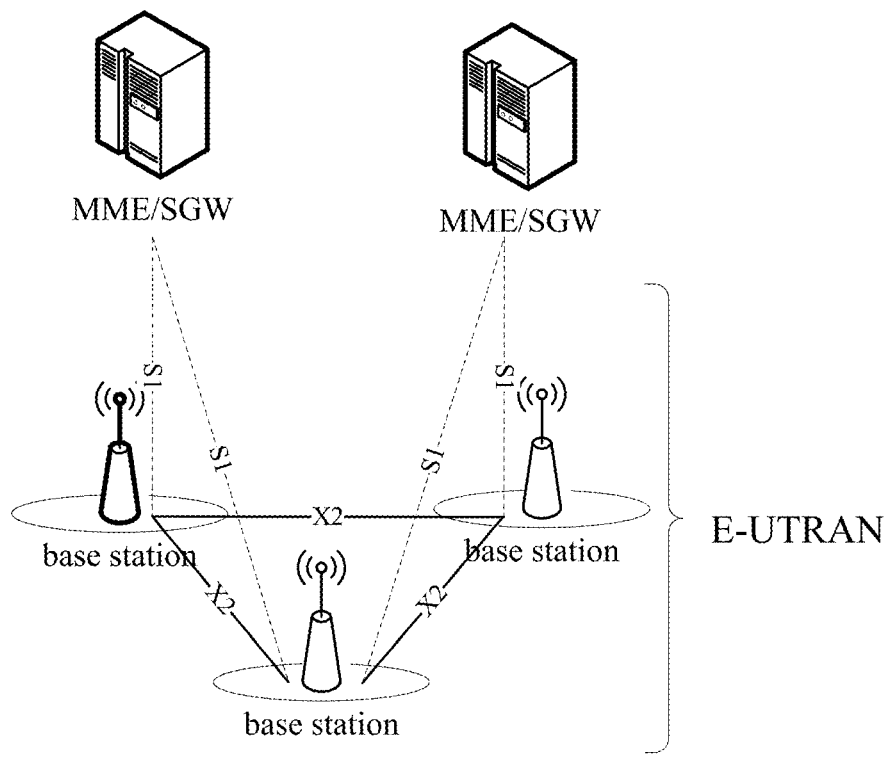
FIG. 1 is a schematic view showing network architecture of an E-UTRAN in the related art.
Figure 2:
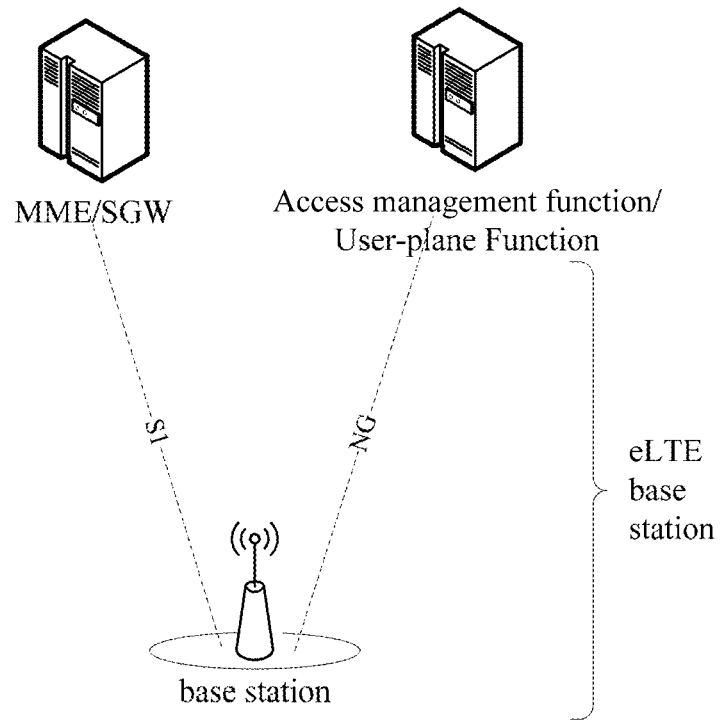
FIG. 2 is a schematic view showing network architecture including two core networks in the related art.
Figure 3:
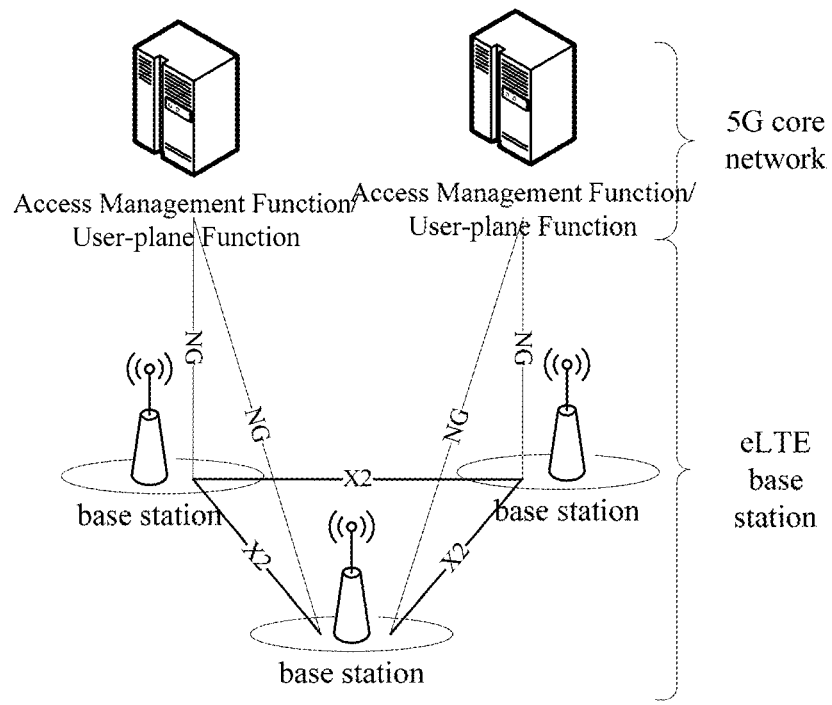
FIG. 3 is a schematic view showing network architecture where an eLTE base station is merely connected to a 5G core network in the related art.
Figure 4:
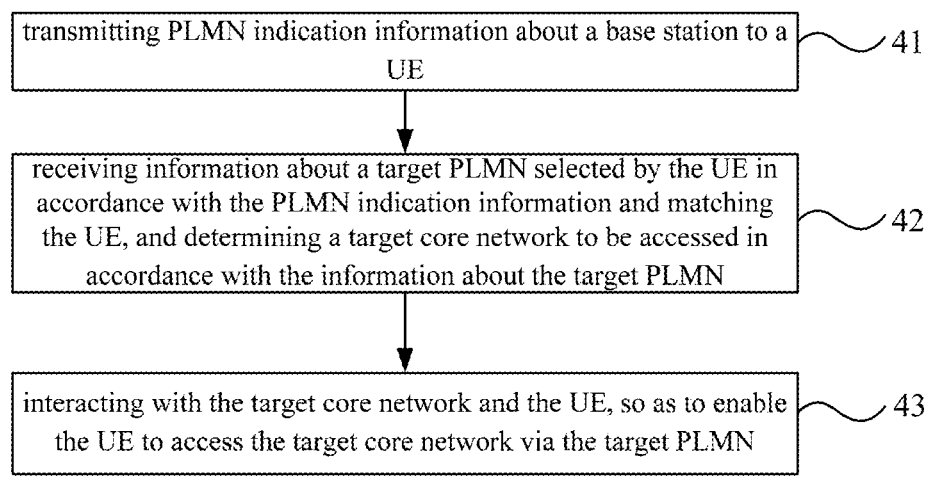
FIG. 4 is a flow chart of a core network accessing method for a base station according to some embodiments of the present disclosure.

As shown in FIG. 4, the present disclosure provides in some embodiments a core network accessing method which includes the following Steps.

Step 41: transmitting PLMN indication information about a base station to a UE.

To be specific, the PLMN indication information may include information about PLMNs connected to a core network of a first type and information about PLMNs connected to a core network of a second type. The PLMNs connected to the core network of the first type may overlap the PLMNs connected to the core network of the second type, i.e., there may exist the one or more PLMNs connected to both the core network of the first type and the core network of the second type. In addition, the core network of the first type may be a 4G core network, and the core network of the second type may be a 5G core network.

The PLMN indication information may be transmitted to the UE through broadcasting. Of course, the transmission of the PLMN indication information may not be limited thereto.

In addition, the information about the PLMNs connected to the core network of the first type and the information about the PLMNs connected to the core network of the second type may be transmitted in the following two modes.

In mode 1, in some possible embodiments of the present disclosure, Step 41 may include transmitting a first PLMN list and a second PLMN list to the UE. The first PLMN list may include the PLMNs connected to the core network of the first type, and the second PLMN list may include the PLMNs connected to the core network of the second type.

The first PLMN list may be an existing PLMN list, and the second PLMN list may be a newly-added PLMN list. In other words, the information about the PLMNs connected to the core network of the first type may be carried in the existing PLMN list, and the newly-added PLMN list may be used to provide the information about the PLMNs connected to the core network of the second type.

To be specific, the base station may be shared by a plurality of service providers, and the core networks for the different service providers may be different. For example, a PLMN 1 may be merely connected to the 4G core network, a PLMN 2 and a PLMN 3 may be connected to both the 4G core network and the 5G core network, and a PLMN 4 may be merely connected to the 5G core network. At this time, the first PLMN list may include the information about the PLMN 1, the PLMN 2 and the PLMN 3, while the second PLMN list may include the information about the PLMN 2, the PLMN 3 and the PLMN 4.

In mode 2, in some possible embodiments of the present disclosure, Step 41 may include transmitting a third PLMN list, first indication information about the third PLMN list, and a fourth PLMN list to the UE. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

To be specific, the third PLMN list may be an existing PLMN list, and the fourth PLMN list may be a newly-added PLMN list. In other words, the information about the PLMNs connected to the core network of the first type and the information about the PLMNs connected to both the core network of the first type and the core network of the second type may be carried in the existing PLMN list. In addition, a separate bitmap may be added to indicate whether each PLMN in the list is connected to the core network of the second type, and a separate list may be added to carry the information about the PLMNs merely connected to the core network of the second type.

To be specific, the base station may be shared by a plurality of service providers, and the core networks for different service providers may be different. For example, the PLMN 1 may be merely connected to the 4G core network, the PLMN 2 and the PLMN 3 may be connected to both the 4G core network and the 5G core network, and the PLMN 4 may be merely connected to the 5G core network. At this time, the third PLMN list may include the information about the PLMN 1, the PLMN 2 and the PLMN 3. Bits 011 may be provided in the bitmap, where 0 represents that the PLMN is not supported to be connected to the 5G core network, and 1 represents that the PLMN is supported to be connected to the 5G core network. A first bit may correspond to a first PLMN in the third PLMN list, a second bit may correspond to a second PLMN in the third PLMN list, and so on. The fourth PLMN list may include the information about the PLMNs merely connected to the 5G core network, i.e., the information about the PLMN 4.

In addition, the PLMNs connected to the core network of the first type may overlap the PLMNs connected to the core network of the second type, i.e., there may exist the one or more PLMNs connected to both the core network of the first type and the core network of the second type. At this time, for the one or more PLMNs capable of being connected to the two core networks, the PLMN indication information may further include indication information indicating whether the one or more PLMNs are connected to the core network of the first type or the core network of the second type preferentially.

In other rods, the PLMN indication information may further include preferential core network indication information indicating a preferential core network for each PLMN connected to the core network of the first type and the core network of the second type, and the preferential core network may be the core network of the first type or the core network of the second type. When the preferential core network indication information is used to indicate whether the PLMN capable of supporting the two core networks is connected to the core network of the second type or the core network of the first type preferentially, it is able for the UE to select the PLMN matching the UE itself in accordance with the to-be-accessed core network.

For example, when the PLMN 2 and the PLMN 3 may be connected to the 4G core network and the 5G core network, additional two-bit information "10" may be provided, where 1 represents that the 5G core network has a higher priority level, and 0 represents that the 4G core network has a higher priority level. For bits "10", it means that the 5G core network connected to the PLMN 2 has a higher priority level, and the 4G core network connected to the PLMN 3 has a higher priority level.

The PLMN indication information may further include a TAC for each PLMN and/or a cell Identity (ID) for each PLMN. In other words, when the information about the PLMNs connected to the core network of the first type and the information about the PLMNs connected to the core network of the second type are broadcast by the base station, the base station may further provide the TAC and the cell ID for each PLMN. For different PLMNs, the TACs or the cell IDs may be different or the same, depending on the planning and deployment of the service providers. The TAC for each PLMN may be broadcast to the UE, so that it is unnecessary for the UE to interact with a network device as long as the UE moves within a TAC range. In addition, the network device may directly page the UE within the TAC range more effectively. Furthermore, with respect to a same cell, different cell IDs may be allocated for different PLMNs. At this time, it is able to prevent the occurrence of interference among the service providers without any negotiation. In the embodiments of the present disclosure, a network sharing scenario has been taken into consideration, so that a same eLTE base station may be deployed and used by different service providers, i.e., it is unnecessary for different service providers to deploy the eLTE base stations in a tightly-coupled manner.

Step 42: receiving information about a target PLMN selected by the UE in accordance with the PLMN indication information and matching the UE, and determining a target core network to be accessed in accordance with the information about the target PLMN.

In Step 41, after the PLMN indication information about the base station has been transmitted to the UE, the UE may select the PLMN matching the UE itself (i.e., matching a Subscriber Identity Module (SIM) installed in the UE) in accordance with the received PLMN indication information.

To be specific, upon the receipt of the PLMN indication information about the base station, the UE may forward all information about the PLMNs capable of being identified by the UE to a Non-Access Stratum (NAS). When the UE is a conventional 4G UE, it may merely identify the PLMNs in the first PLMN list or the third PLMN list, and then select an appropriate PLMN from the identified PLMN list. When the UE is an eLTE UE, it may identify the PLMNs in the first PLMN list, the PLMNs in the second PLMN list and the preferential core network indication information about the PLMNs that support the two core networks, or the third PLMN list, the indication information about the third PLMN list, the fourth PLMN list and the preferential core network indication information about the PLMNs that support the two core networks.

After the target PLMN has been selected by the NAS, it may notify it to an Access Stratum (AS). The AS may select an appropriate cell for the PLMN and reside therein. Hence, when the UE initiates an access and is connected to the network, the information about the selected target PLMN may be transmitted to the base station.

When the selected target PLMN merely supports one core network, the base station may directly determine the core network to be accessed in accordance with the target PLMN.

In addition, when the selected target PLMN supports the two core networks, the UE further needs to indicate whether it is necessary to access the core network of the second type. In other words, the UE may notify the base station of the core network in the two core networks to be accessed while transmitting the information about the target PLMN to the base station.

In other words, when the target PLMN is connected to the core network of the first type and the core network of the second type, the information about the target PLMN may include second indication information indicating that the target PLMN is connected to the core network of the first type and the core network of the second type. The receiving the information about the target PLMN selected by the UE in accordance with the PLMN indication information and matching the UE and determining the target core network to be accessed in accordance with the information about the target PLMN may include: receiving the information about the target PLMN selected by the UE in accordance with the PLMN indication information and matching the UE, and third indication information indicating whether the UE needs to access the core network of the second type; and determining the target core network to be accessed in accordance with the third indication information and the second indication information in the information about the target PLMN.

Hence, when the selected target PLMN supports the two core networks, the base station needs to determine whether the to-be-accessed target core network is the core network of the first type or the core network of the second type in accordance with the second indication information indicating that the target PLMN is connected to the core network of the first type and the core network of the second type as well as the third indication information indicating whether the UE needs to access the core network of the second type. To be specific, when the third indication information indicates that the UE needs to access the core network of the second type, the target core network may be the core network of the second type, and when the third indication information indicates that the UE does not need to access the core network of the second type, the target PLMN may also support the core network of the first type based on the second indication information, so the target core network may be the core network of the first type.

Step 43: interacting with the target core network and the UE, so as to enable the UE to access the target core network via the target PLMN.

After the to-be-accessed target core network has been determined through Step 42, the base station may interact with the target core network and the UE, so as to enable the UE to access the target core network via the target PLMN.

In addition, in some possible embodiments of the present disclosure, the core network accessing method may further include: receiving information about a preferential PLMN supported by the UE and a preferential core network from the UE, the preferential core network being the core network of the first type or the core network of the second type; and when the UE moves out of a coverage of the base station, selecting, by the base station, a target base station supporting the preferential PLMN and the preferential core network, and notifying the target base station to configure resources for the UE, so as to enable the UE to be connected to the target base station.

In other words, when or after the UE has accessed the network, the UE may report the preferential network, i.e., the information about the preferential PLMN and the preferential core network. For example, a user may configure the core network of the second type for one or more PLMNs as the preferential network. When the UE is about to move out of the coverage of the base station and the base station is ready for selecting the to-be-switched target base station, the base station may select an appropriate target base station and an appropriate target network for the UE in accordance with the information about the preferential network reported by the UE. When the target base station supports the preferential target network, the target base station may configure the corresponding resources and configurations, including confirming whether the user is allowed to access the target core network. After the target core network and a target cell have been selected, the target base station may feed a relevant handover command back to the original base station, so as to enable the UE to be connected to the target base station.

In a word, according to this embodiment of the present disclosure, the base station may transmit the information about the PLMNs connected to the core network of the first type and the information about the PLMNs connected to the core network of the second type to the UE, and the UE may select the target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

In this embodiment of the present disclosure, in a scenario where the eLTE base station is connected to the two core networks, the scheme is provided, so as to enable the base station to provide services for the original 4G UE and the eLTE UE that supports 5G NAS. As a result, it is able to ensure that the evolved transition network may be compatible with the UE of various systems, thereby to enable the UE to acquire the services from the network. In addition, the network sharing scenario has been taken into consideration, so that the same eLTE base station may be deployed and used by different service providers, i.e., it is unnecessary for different service providers to deploy the eLTE base stations in a tightly-coupled manner.

Second Embodiment

Figure 5:
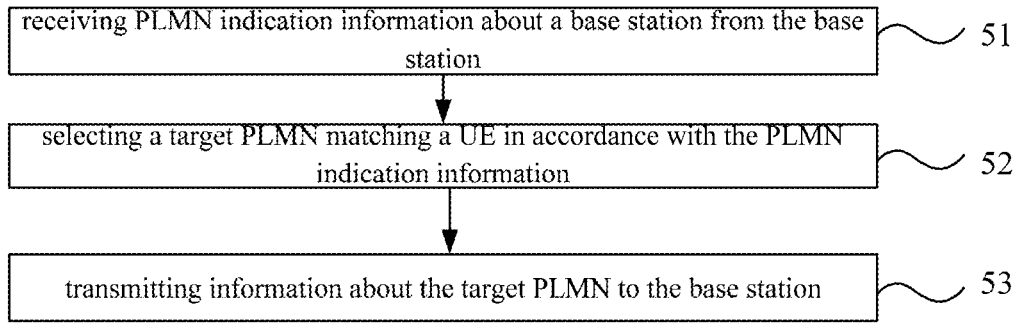
FIG. 5 is a flow chart of a core network accessing method for a UE according to some embodiments of the present disclosure.

As shown in FIG. 5, the present disclosure further provides in this embodiment a core network accessing method which includes the following steps.

Step 51: receiving PLMN indication information about a base station from the base station.

The PLMN indication information may include information about PLMNs connected to a core network of a first type and information about PLMNs connected to a core network of a second type. The PLMNs connected to the core network of the first type may overlap the PLMNs connected to the core network of the second type, i.e., there may exist the one or more PLMNs connected to both the core network of the first type and the core network of the second type. In addition, the core network of the first type may be a 4G core network, and the core network of the second type may be a 5G core network.

In addition, the information about the PLMNs connected to the core network of the first type and the information about the PLMNs connected to the core network of the second type may be received in the following two modes.

In mode 1, in some possible embodiments of the present disclosure, Step 51 may include receiving a first PLMN list and a second PLMN list from the base station. The first PLMN list may include the PLMNs connected to the core network of the first type, and the second PLMN list may include the PLMNs connected to the core network of the second type.

The first PLMN list may be an existing PLMN list, and the second PLMN list may be a newly-added PLMN list. In other words, the information about the PLMNs connected to the core network of the first type may be carried in the existing PLMN list, and the newly-added PLMN list may be used to provide the information about the PLMNs connected to the core network of the second type.

To be specific, the base station may be shared by a plurality of service providers, and the core networks for the different service providers may be different. For example, a PLMN 1 may be merely connected to the 4G core network, a PLMN 2 and a PLMN 3 may be connected to both the 4G core network and the 5G core network, and a PLMN 4 may be merely connected to the 5G core network. At this time, the first PLMN list may include the information about the PLMN 1, the PLMN 2 and the PLMN 3, while the second PLMN list may include the information about the PLMN 2, the PLMN 3 and the PLMN 4.

In mode 2, in some possible embodiments of the present disclosure, Step 51 may include receiving a third PLMN list, first indication information about the third PLMN list, and a fourth PLMN list from the base station. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

To be specific, the third PLMN list may be an existing PLMN list, and the fourth PLMN list may be a newly-added PLMN list. In other words, the information about the PLMNs connected to the core network of the first type and the information about the PLMNs connected to both the core network of the first type and the core network of the second type may be carried in the existing PLMN list. In addition, a separate bitmap may be added to indicate whether each PLMN in the list is connected to the core network of the second type, and a separate list may be added to carry the information about the PLMNs merely connected to the core network of the second type.

To be specific, the base station may be shared by a plurality of service providers, and the core networks for different service providers may be different. For example, the PLMN 1 may be merely connected to the 4G core network, the PLMN 2 and the PLMN 3 may be connected to both the 4G core network and the 5G core network, and the PLMN 4 may be merely connected to the 5G core network. At this time, the third PLMN list may include the information about the PLMN 1, the PLMN 2 and the PLMN 3. Bits 011 may be provided in the bitmap, where 0 represents that the PLMN is not supported to be connected to the 5G core network, and 1 represents that the PLMN is supported to be connected to the 5G core network. A first bit may correspond to a first PLMN in the third PLMN list, a second bit may correspond to a second PLMN in the third PLMN list, and so on. The fourth PLMN list may include the information about the PLMNs merely connected to the 5G core network, i.e., the information about the PLMN 4.

In addition, the PLMNs connected to the core network of the first type may overlap the PLMNs connected to the core network of the second type, i.e., there may exist the one or more PLMNs connected to both the core network of the first type and the core network of the second type. At this time, for the one or more PLMNs capable of being connected to the two core networks, the PLMN indication information may further include indication information indicating whether the one or more PLMNs are connected to the core network of the first type or the core network of the second type preferentially.

In other rods, the PLMN indication information may further include preferential core network indication information indicating a preferential core network for each PLMN connected to the core network of the first type and the core network of the second type, and the preferential core network may be the core network of the first type or the core network of the second type. When the preferential core network indication information is used to indicate whether the PLMN capable of supporting the two core networks is connected to the core network of the second type or the core network of the first type preferentially, it is able for the UE to select the PLMN matching the UE itself in accordance with the to-be-accessed core network.

For example, when the PLMN 2 and the PLMN 3 may be connected to the 4G core network and the 5G core network, additional two-bit information "10" may be provided, where 1 represents that the 5G core network has a higher priority level, and 0 represents that the 4G core network has a higher priority level. For bits "10", it means that the 5G core network connected to the PLMN 2 has a higher priority level, and the 4G core network connected to the PLMN 3 has a higher priority level.

The PLMN indication information may further include a TAC for each PLMN and/or a cell ID for each PLMN. In other words, when the information about the PLMNs connected to the core network of the first type and the information about the PLMNs connected to the core network of the second type are broadcast by the base station, the base station may further provide the TAC and the cell ID for each PLMN. For different PLMNs, the TACs or the cell IDs may be different or the same, depending on the planning and deployment of the service providers. The TAC for each PLMN may be broadcast to the UE, so that it is unnecessary for the UE to interact with a network device as long as the UE moves within a TAC range. In addition, the network device may directly page the UE within the TAC range more effectively. Furthermore, with respect to a same cell, different cell IDs may be allocated for different PLMNs. At this time, it is able to prevent the occurrence of interference among the service providers without any negotiation. In the embodiments of the present disclosure, a network sharing scenario has been taken into consideration, so that a same eLTE base station may be deployed and used by different service providers, i.e., it is unnecessary for different service providers to deploy the eLTE base stations in a tightly-coupled manner.

Step 52: selecting a target PLMN matching the UE in accordance with the PLMN indication information.

Upon the receipt of the PLMN indication information about the base station through Step 51, the UE may select an appropriate PLMN matching the UE itself (i.e., matching an SIM installed in the UE) in accordance with the received PLMN indication information.

To be specific, upon the receipt of the PLMN indication information about the base station, the UE may forward all information about the PLMNs capable of being identified by the UE to an NAS. When the UE is a conventional 4G UE, it may merely identify the PLMNs in the first PLMN list or the third PLMN list, and then select an appropriate PLMN from the identified PLMN list. When the UE is an eLTE UE, it may identify the PLMNs in the first PLMN list, the PLMNs in the second PLMN list and the preferential core network indication information about the PLMNs that support the two core networks, or the third PLMN list, the indication information about the third PLMN list, the fourth PLMN list and the preferential core network indication information about the PLMNs that support the two core networks.

After the target PLMN has been selected by the NAS, it may notify it to an AS. The AS may select an appropriate cell for the PLMN and reside therein. Hence, when the UE initiates an access and is connected to the network, the information about the selected target PLMN may be transmitted to the base station.

Step 53: transmitting information about the target PLMN to the base station.

The information about the target PLMN may be carried in a Radio Resource Control (RRC) connection establishment request message or an RRC connection establishment completion message, and transmitted to the base station.

In addition, when the selected target PLMN merely supports one core network, the base station may directly determine the core network to be accessed in accordance with the target PLMN.

When the selected target PLMN supports the two core networks, the UE further needs to indicate whether it is necessary to access the core network of the second type. In other words, the UE may notify the base station of the core network in the two core networks to be accessed while transmitting the information about the target PLMN to the base station.

In other words, in some possible embodiments of the present disclosure, when the target PLMN is connected to the core network of the first type and the core network of the second type, the information about the target PLMN may include second indication information indicating that the target PLMN is connected to the core network of the first type and the core network of the second type. Step 53 may include transmitting the information about the target PLMN including the second indication information and third indication information indicating whether the UE needs to access the core network of the second type to the base station.

Hence, when the selected target PLMN supports the two core networks, the base station needs to determine whether the to-be-accessed target core network is the core network of the first type or the core network of the second type in accordance with the second indication information indicating that the target PLMN is connected to the core network of the first type and the core network of the second type as well as the third indication information indicating whether the UE needs to access the core network of the second type. To be specific, when the third indication information indicates that the UE needs to access the core network of the second type, the target core network may be the core network of the second type, and when the third indication information indicates that the UE does not need to access the core network of the second type, the target PLMN may also support the core network of the first type based on the second indication information, so the target core network may be the core network of the first type.

In some possible embodiments of the present disclosure, the core network accessing method may further include reporting information about a preferential PLMN supported by the UE and a preferential core network to the base station, so that when the UE moves out of a coverage of the base station, the base station selects a target base station supporting the preferential PLMN and the preferential core network, and notifies the target base station to configure resources for the UE, so as to enable the UE to be connected to the target base station. The preferential core network may be the core network of the first type or the core network of the second type.

In other words, when or after the UE has accessed the network, the UE may report the preferential network, i.e., the information about the preferential PLMN and the preferential core network. For example, a user may configure the core network of the second type for one or more PLMNs as the preferential network. When the UE is about to move out of the coverage of the base station and the base station is ready for selecting the to-be-switched target base station, the base station may select an appropriate target base station and an appropriate target network for the UE in accordance with the information about the preferential network reported by the UE. When the target base station supports the preferential target network, the target base station may configure the corresponding resources and configurations, including confirming whether the user is allowed to access the target core network. After the target core network and a target cell have been selected, the target base station may feed a relevant handover command back to the original base station, so as to enable the UE to be connected to the target base station.

In a word, according to this embodiment of the present disclosure, the base station may transmit the information about the PLMNs connected to the core network of the first type and the information about the PLMNs connected to the core network of the second type to the UE, and the UE may select the target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

In this embodiment of the present disclosure, in a scenario where the eLTE base station is connected to the two core networks, the scheme is provided, so as to enable the base station to provide services for the original 4G UE and the eLTE UE that supports 5G NAS. As a result, it is able to ensure that the evolved transition network may be compatible with the UE of various systems, thereby to enable the UE to acquire the services from the network. In addition, the network sharing scenario has been taken into consideration, so that the same eLTE base station may be deployed and used by different service providers, i.e., it is unnecessary for different service providers to deploy the eLTE base stations in a tightly-coupled manner.

Third Embodiment

Figure 6:
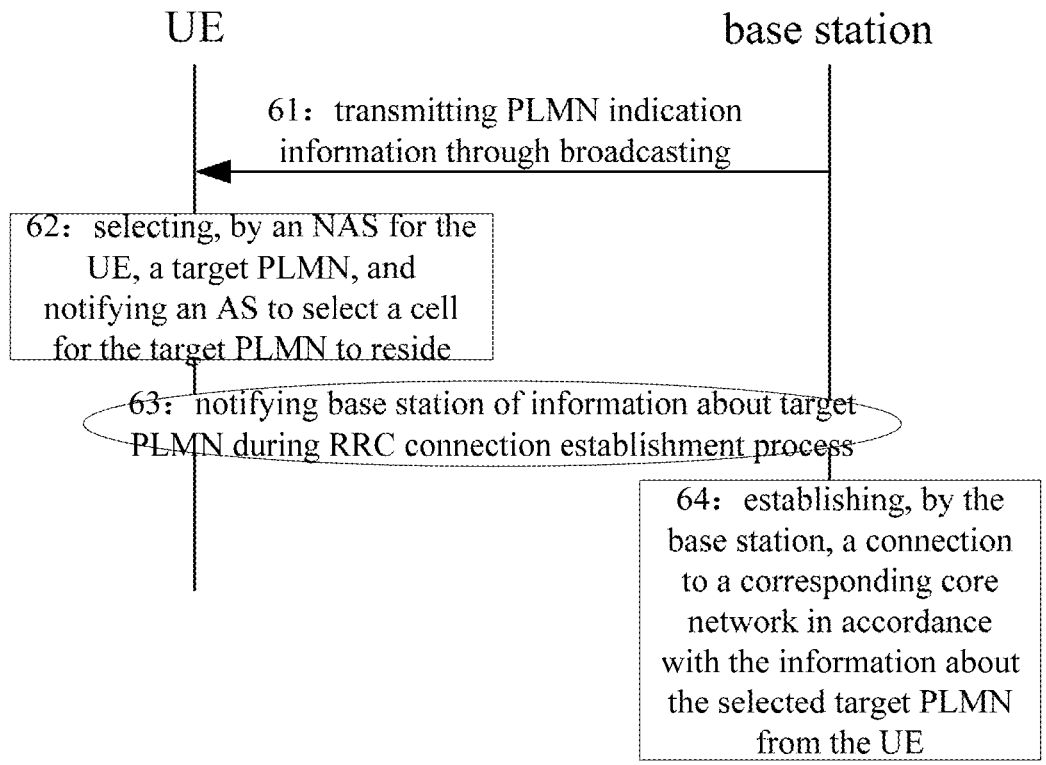
FIG. 6 is a schematic view showing the core network accessing method according to some embodiments of the present disclosure.

Based on the first embodiment and the second embodiment, the present disclosure further provides in this embodiment a core network accessing method which includes the following steps as shown in FIG. 6.

Step 61: transmitting, by a base station, PLMN indication information through broadcasting. The PLMN indication information may include information about PLMNs connected to a core network of a first type and information about PLMNs connected to a core network of a second type. The core network of the first type may be a 4G core network, and the core network of the second type may be a 5G core network.

Step 62: selecting, by an NAS for a UE, a target PLMN and notifying an AS to select a cell for the target PLMN to reside.

Step 63: notifying the base station of information about the selected target PLMN during an RRC connection establishment procedure.

Step 64: establishing, by the base station, a connection with a corresponding core network in accordance with the information about the selected target PLMN.

In a word, according to this embodiment of the present disclosure, the base station may transmit the information about the PLMNs connected to the core network of the first type and the information about the PLMNs connected to the core network of the second type to the UE, and the UE may select the target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

Fourth Embodiment

Figure 7:
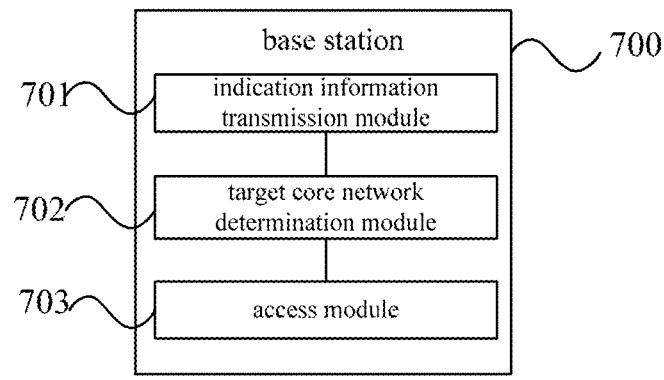
FIG. 7 is a schematic view showing the base station according to some embodiments of the present disclosure.

The present disclosure further provides in this embodiment a base station 700 which, as shown in FIG. 7, includes: an indication information transmission module 701 configured to transmit PLMN indication information about the base station to a UE, the PLMN indication information including information about PLMNs connected to a core network of a first type and information about PLMNs connected to a core network of a second type; a target core network determination module 702 configured to receive information about a target PLMN selected by the UE in accordance with the PLMN indication information and matching the UE, and determine a target core network to be accessed in accordance with the information about the target PLMN; and an access module 703 configured to interact with the target core network and the UE, so as to enable the UE to access the target core network via the target PLMN.

In some possible embodiments of the present disclosure, the indication information transmission module 701 may include a first transmission unit configured to transmit a first PLMN list and a second PLMN list to the UE. The first PLMN list may include the PLMNs connected to the core network of the first type, and the second PLMN list may include the PLMNs connected to the core network of the second type.

In some possible embodiments of the present disclosure, the indication information transmission module 701 may include a second transmission unit configured to transmit a third PLMN list, first indication information about the third PLMN list, and a fourth PLMN list to the UE. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

In some possible embodiments of the present disclosure, the PLMN indication information may further include preferential core network indication information indicating a preferential core network for each PLMN connected to the core network of the first type and the core network of the second type, and the preferential core network may be the core network of the first type or the core network of the second type.

In some possible embodiments of the present disclosure, the PLMN indication information may further include a TAC for each PLMN and/or a cell ID for each PLMN.

In some possible embodiments of the present disclosure, when the target PLMN is connected to both the core network of the first type and the core network of the second type, the information about the target PLMN may include second indication information indicating that the target PLMN is connected to the core network of the first type and the core network of the second type. The target core network determination module 702 may include: an information reception unit configured to receive the information about the target PLMN selected by the UE in accordance with the PLMN indication information and matching the UE, and third indication information indicating whether the UE needs to access the core network of the second type; and a target core network determination unit configured to determine the target core network to be accessed in accordance with the third indication information and the second indication information in the information about the target PLMN.

In some possible embodiments of the present disclosure, the base station 700 may further include: an information reception module configured to receive information about a preferential PLMN supported by the UE and a preferential core network from the UE, the preferential core network being the core network of the first type or the core network of the second type; and a target base station determination module configured to, when the UE moves out of a coverage of the base station, select a target base station supporting the preferential PLMN and the preferential core network, and notify the target base station to configure resources for the UE, so as to enable the UE to be connected to the target base station.

Functions of the modules and units of the base station may be achieved through a same entity or different entities.

In a word, according to this embodiment of the present disclosure, the base station may transmit the information about the PLMNs connected to the core network of the first type and the information about the PLMNs connected to the core network of the second type to the UE, and the UE may select the target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

Fifth Embodiment

Figure 8:
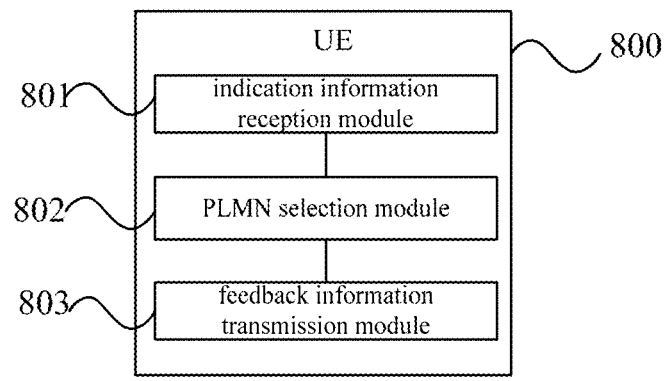
FIG. 8 is a schematic view showing the UE according to some embodiments of the present disclosure.

The present disclosure further provides in this embodiment a UE 800 which, as shown in FIG. 8, includes: an indication information reception module 801 configured to receive PLMN indication information about a base station from the base station, the PLMN indication information including information about PLMNs connected to a core network of a first type and information about PLMNs connected to a core network of a second type; a PLMN selection module 802 configured to select a target PLMN matching the UE in accordance with the PLMN indication information; and a feedback information transmission module 803 configured to transmit information about the target PLMN to the base station.

In some possible embodiments of the present disclosure, the indication information reception module 801 may include a first reception unit configured to receive a first PLMN list and a second PLMN list from the base station.

The first PLMN list may include the PLMNs connected to the core network of the first type, and the second PLMN list may include the PLMNs connected to the core network of the second type.

In some possible embodiments of the present disclosure, the indication information reception module 801 may include a second reception unit configured to receive a third PLMN list, first indication information about the third PLMN list, and a fourth PLMN list from the base station. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

In some possible embodiments of the present disclosure, the PLMN indication information may further include preferential core network indication information indicating a preferential core network for each PLMN connected to the core network of the first type and the core network of the second type, and the preferential core network is the core network of the first type or the core network of the second type.

In some possible embodiments of the present disclosure, the PLMN indication information further includes a TAC for each PLMN and/or a cell ID for each PLMN.

In some possible embodiments of the present disclosure, when the target PLMN is connected to both the core network of the first type and the core network of the second type, the information about the target PLMN may include second indication information indicating that the target PLMN is connected to the core network of the first type and the core network of the second type. The feedback information transmission module 803 is further configured to transmit the information about the target PLMN including the second indication information and third indication information indicating whether the UE needs to access the core network of the second type to the base station.

In some possible embodiments of the present disclosure, the UE 800 may further include an information reporting module configured to report information about a preferential PLMN supported by the UE and a preferential core network to the base station, so that, when the UE moves out of a coverage of the base station, the base station selects a target base station supporting the preferential PLMN and the preferential core network, and notifies the target base station to configure resources for the UE, so as to enable the UE to be connected to the target base station. The preferential core network may be the core network of the first type or the core network of the second type.

Functions of the modules and units of the UE may be achieved through a same entity or different entities.

In a word, according to this embodiment of the present disclosure, the base station may transmit the information about the PLMNs connected to the core network of the first type and the information about the PLMNs connected to the core network of the second type to the UE, and the UE may select the target PLMN matching the UE itself from the PLMNs and determine the core network to be accessed in accordance with the selected target PLMN. As a result, it is able to solve the problem in the related art where it is impossible for the UE to select the to-be-accessed core network in the network architecture including two core networks.

Sixth Embodiment

Figure 9:
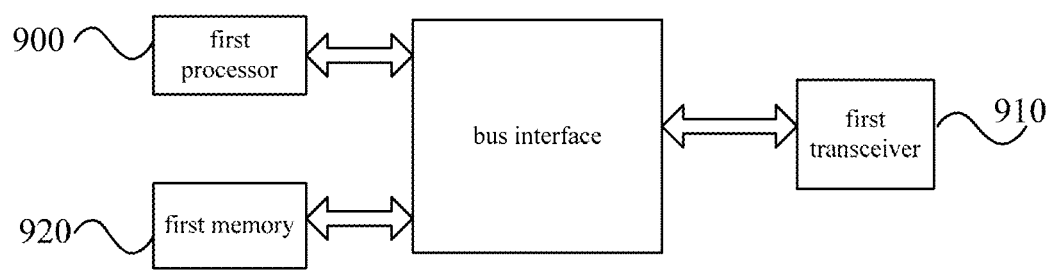
FIG. 9 is a block diagram of the base station according to some embodiments of the present disclosure.

As shown in FIG. 9, the present disclosure further provides in this embodiment a base station, including a first memory 920, a first processor 900, and a computer program stored in the first memory 920 and executed by the first processor 900. The first processor 900 is configured to read the computer program stored in the first memory 920, so as to: transmit through a first transceiver 910, PLMN indication information about the base station to a UE, receive information about a target PLMN selected by the UE in accordance with the PLMN indication information and matching the UE, determine a target core network to be accessed in accordance with the information about the target PLMN, and interact with the target core network and the UE, so as to enable the UE to access the target core network via the target PLMN. The PLMN indication information may include information about PLMNs connected to a core network of a first type and information about PLMNs connected to a core network of a second type.

In FIG. 9, bus architecture may include a number of buses and bridges connected to each other, so as to connect various circuits for one or more first processors 900 and one or more first memories 920. In addition, as is known in the art, the bus architecture may be used to connect any other circuits, such as a circuit for a peripheral device, a circuit for a voltage stabilizer and a power management circuit. A bus interface may be provided, and the transceiver 910 may consist of a plurality of elements, i.e., a transmitter and a receiver for communication with any other devices over a transmission medium. The first processor 900 may take charge of managing the bus architecture as well as general processings. The first memory 920 may store therein data for the operation of the first processor 900.

When transmitting the PLMN indication information about the base station to the UE, the first transceiver 910 is further configured to transmit a first PLMN list and a second PLMN list to the UE. The first PLMN list may include the PLMNs connected to the core network of the first type, and the second PLMN list may include the PLMNs connected to the core network of the second type.

When transmitting the PLMN indication information about the base station to the UE, the first transceiver 910 is further configured to transmit a third PLMN list, first indication information about the third PLMN list, and a fourth PLMN list to the UE. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

In some possible embodiments of the present disclosure, the PLMN indication information may further include preferential core network indication information indicating a preferential core network for each PLMN connected to the core network of the first type and the core network of the second type, and the preferential core network may be the core network of the first type or the core network of the second type.

In some possible embodiments of the present disclosure, the PLMN indication information may further include a TAC for each PLMN and/or a cell ID for each PLMN.

In some possible embodiments of the present disclosure, when the target PLMN is connected to both the core network of the first type and the core network of the second type, the information about the target PLMN may include second indication information indicating that the target PLMN is connected to the core network of the first type and the core network of the second type. When receiving the information about the target PLMN selected by the UE in accordance with the PLMN indication information and matching the UE so as to enable the first processor 900 to determine the target core network to be accessed in accordance with the information about the target PLMN, the first transceiver 910 is further configured to receive the information about the target PLMN selected by the UE in accordance with the PLMN indication information and matching the UE, and third indication information indicating whether the UE needs to access the core network of the second type, and the first processor 900 is further configured to determine the target core network to be accessed in accordance with the third indication information and the second indication information in the information about the target PLMN.

In some possible embodiments of the present disclosure, the first transceiver 910 is further configured to receive information about a preferential PLMN supported by the UE and a preferential core network from the UE, and the preferential core network may be the core network of the first type or the core network of the second type. The first processor 900 is configured to, when the UE moves out of coverage of the base station, select a target base station supporting the preferential PLMN and the preferential core network, and notify the target base station to configure resources for the UE, so as to enable the UE to be connected to the target base station.

Seventh Embodiment

Figure 10:
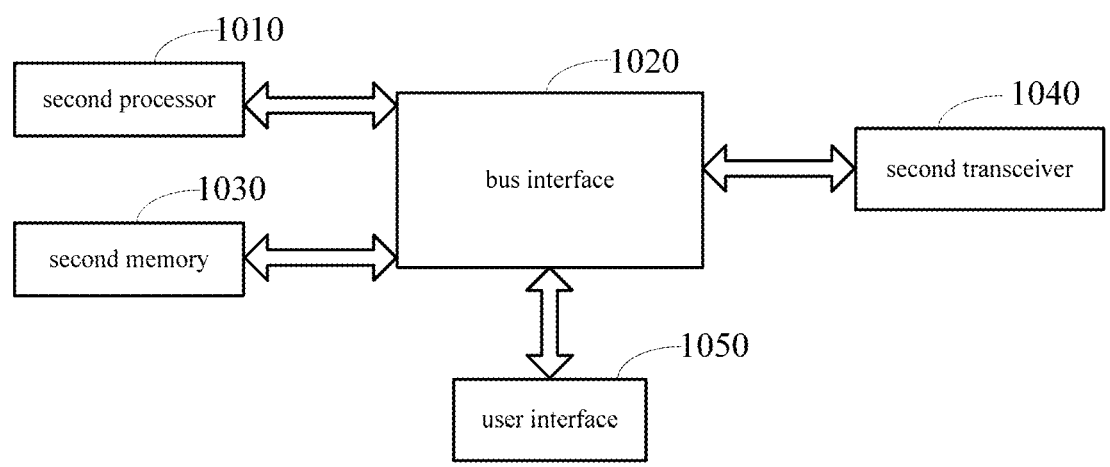
FIG. 10 is a block diagram of the UE according to some embodiments of the present disclosure.

In order to achieve the above purpose in a better manner, as shown in FIG. 10, the present disclosure further provides in this embodiment a UE, including a second processor 1010, a second memory 1030 connected to the second processor 1010 via a bus interface 1020 and storing therein programs and data for the operation of the second processor 1010, and a second transceiver 1040 connected to the second processor 1010 via the bus interface 1020 and configured to receive and transmit data under the control of the second processor 1010.

The second transceiver 1040 is further configured to receive PLMN indication information about a base station from the base station. The second processor 1010 is configured to select a target PLMN matching the UE in accordance with the PLMN indication information. The second transceiver 1040 is further configured to transmit information about the target PLMN to the base station. The PLMN indication information may include information about PLMNs connected to a core network of a first type and information about PLMNs connected to a core network of a second type.

When receiving the PLMN indication information about the base station from the base station, the second transceiver 1040 is further configured to receive a first PLMN list and a second PLMN list from the base station. The first PLMN list may include the PLMNs connected to the core network of the first type, and the second PLMN list may include the PLMNs connected to the core network of the second type.

When receiving the PLMN indication information about the base station from the base station, the second transceiver 1040 is further configured to receive a third PLMN list, first indication information about the third PLMN list, and a fourth PLMN list from the base station. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

The PLMN indication information may further include preferential core network indication information indicating a preferential core network for each PLMN connected to the core network of the first type and the core network of the second type, and the preferential core network is the core network of the first type or the core network of the second type.

The PLMN indication information may further include a TAC for each PLMN and/or a cell ID for each PLMN.

When the target PLMN is connected to both the core network of the first type and the core network of the second type, the information about the target PLMN may include second indication information indicating that the target PLMN is connected to the core network of the first type and the core network of the second type. When transmitting the information about the target PLMN to the base station, the second transceiver 1040 is further configured to transmit the information about the target PLMN including the second indication information and third indication information indicating whether the UE needs to access the core network of the second type to the base station.

The second transceiver 1040 is further configured to report information about a preferential PLMN supported by the UE and a preferential core network to the base station, so that, when the UE moves out of a coverage of the base station, the base station selects a target base station supporting the preferential PLMN and the preferential core network, and notifies the target base station to configure resources for the UE, so as to enable the UE to be connected to the target base station. The preferential core network may be the core network of the first type or the core network of the second type.

It should be appreciated that, in FIG. 10, bus architecture may include a number of buses and bridges connected to each other, so as to connect various circuits for one or more second processors 1010 and one or more second memories 1030. In addition, as is known in the art, the bus architecture may be used to connect any other circuits, such as a circuit for a peripheral device, a circuit for a voltage stabilizer and a power management circuit. The bus interface may be provided, and the second transceiver 1040 may consist of a plurality of elements, i.e., a transmitter and a receiver for communication with any other devices over a transmission medium. With respect to different UEs, a user interface 1050 may also be provided for devices which are to be arranged inside or outside the UE, and these devices may include but not limited to a keypad, a display, a speaker, a microphone and a joystick. The second processor 1010 may take charge of managing the bus architecture as well as general processings. The second memory 1030 may store therein data for the operation of the second processor 1010.

It should be appreciated that, all of, or parts of, the above steps may be implemented through hardware, or through hardware associated with a computer program. The computer program may include instructions capable of implementing all of, or parts of, the above steps. In addition, the computer program may be stored in a computer-readable storage medium in any form.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

Eighth Embodiment

The present disclosure further provides in this embodiment a computer-readable storage medium storing therein a computer program. The computer program is executed by a processor so as to perform the following steps: transmitting PLMN indication information about the base station to a UE, the PLMN indication information including information about PLMNs connected to a core network of a first type and information about PLMNs connected to a core network of a second type; receiving information about a target PLMN selected by the UE in accordance with the PLMN indication information and matching the UE, and determine a target core network to be accessed in accordance with the information about the target PLMN; and interacting with the target core network and the UE, so as to enable the UE to access the target core network via the target PLMN.

In some possible embodiments of the present disclosure, the transmitting the PLMN indication information about the base station to the UE may include transmitting a first PLMN list and a second PLMN list to the UE. The first PLMN list may include the PLMNs connected to the core network of the first type, and the second PLMN list may include the PLMNs connected to the core network of the second type.

In some possible embodiments of the present disclosure, the transmitting the PLMN indication information about the base station to the UE may include transmitting a third PLMN list, first indication information about the third PLMN list, and a fourth PLMN list to the UE. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

In some possible embodiments of the present disclosure, the PLMN indication information may further include preferential core network indication information indicating a preferential core network for each PLMN connected to the core network of the first type and the core network of the second type, and the preferential core network may be the core network of the first type or the core network of the second type.

In some possible embodiments of the present disclosure, the PLMN indication information may further include a TAC for each PLMN and/or a cell ID for each PLMN.

In some possible embodiments of the present disclosure, when the target PLMN is connected to both the core network of the first type and the core network of the second type, the information about the target PLMN may include second indication information indicating that the target PLMN is connected to the core network of the first type and the core network of the second type. The receiving the information about the target PLMN selected by the UE in accordance with the PLMN indication information and matching the UE and determining the target core network to be accessed in accordance with the information about the target PLMN may include: receiving the information about the target PLMN selected by the UE in accordance with the PLMN indication information and matching the UE, and third indication information indicating whether the UE needs to access the core network of the second type; and determining the target core network to be accessed in accordance with the third indication information and the second indication information in the information about the target PLMN.

In some possible embodiments of the present disclosure, the computer program is further executed by the processor so as to perform the following steps: receiving information about a preferential PLMN supported by the UE and a preferential core network from the UE, the preferential core network being the core network of the first type or the core network of the second type; and when the UE moves out of a coverage of the base station, selecting, by the base station, a target base station supporting the preferential PLMN and the preferential core network, and notifying the target base station to configure resources for the UE, so as to enable the UE to be connected to the target base station.

Ninth Embodiment

The present disclosure further provides in this embodiment a computer-readable storage medium storing therein a computer program. The computer program is executed by a processor so as to perform the following steps: receiving PLMN indication information about a base station from the base station, the PLMN indication information including information about PLMNs connected to a core network of a first type and information about PLMNs connected to a core network of a second type; selecting a target PLMN matching a UE in accordance with the PLMN indication information; and transmitting information about the target PLMN to the base station.

In some possible embodiments of the present disclosure, the receiving the PLMN indication information about the base station from the base station may include receiving a first PLMN list and a second PLMN list from the base station. The first PLMN list may include the PLMNs connected to the core network of the first type, and the second PLMN list may include the PLMNs connected to the core network of the second type.

In some possible embodiments of the present disclosure, the receiving the PLMN indication information about the base station from the base station may include receiving a third PLMN list, first indication information about the third PLMN list, and a fourth PLMN list from the base station. The third PLMN list may include PLMNs merely connected to the core network of the first type and PLMNs connected to both the core network of the first type and the core network of the second type. The first indication information may be used to indicate whether each PLMN in the third PLMN list is connected to the core network of the second type. The fourth PLMN list may include PLMNs merely connected to the core network of the second type.

In some possible embodiments of the present disclosure, the PLMN indication information may further include preferential core network indication information indicating a preferential core network for each PLMN connected to the core network of the first type and the core network of the second type, and the preferential core network may be the core network of the first type or the core network of the second type.

In some possible embodiments of the present disclosure, the PLMN indication information may further include a TAC for each PLMN and/or a cell ID for each PLMN.

In some possible embodiments of the present disclosure, when the target PLMN is connected to both the core network of the first type and the core network of the second type, the information about the target PLMN may include second indication information indicating that the target PLMN is connected to the core network of the first type and the core network of the second type. The transmitting the information about the target PLMN to the base station may include transmitting the information about the target PLMN including the second indication information and third indication information indicating whether the UE needs to access the core network of the second type to the base station.

In some possible embodiments of the present disclosure, the computer program is further executed by the processor so as to perform the following step of reporting information about a preferential PLMN supported by the UE and a preferential core network to the base station, so that when the UE moves out of a coverage of the base station, the base station selects a target base station supporting the preferential PLMN and the preferential core network, and notifies the target base station to configure resources for the UE, so as to enable the UE to be connected to the target base station. The preferential core network may be the core network of the first type or the core network of the second type.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A core network accessing method, comprising:
transmitting Public Land Mobile Network (PLMN) indication information about a base station to a User Equipment (UE), the PLMN indication information comprising information about PLMNs connected to a core network of a first type and information about PLMNs connected to a core network of a second type;
receiving information about a target PLMN selected by the UE in accordance with the PLMN indication information and matching the UE, and determining a target core network to be accessed in accordance with the information about the target PLMN; and
interacting with the target core network and the UE, so as to enable the UE to access the target core network via the target PLMN,
wherein when the target PLMN is connected to both the core network of the first type and the core network of the second type, the information about the target PLMN comprises second indication information indicating that the target PLMN is connected to the core network of the first type and the core network of the second type,
wherein the receiving the information about the target PLMN selected by the UE in accordance with the PLMN indication information and matching the UE and determining the target core network to be accessed in accordance with the information about the target PLMN comprises:
receiving the information about the target PLMN selected by the UE in accordance with the PLMN indication information and matching the UE, and third indication information indicating whether the UE needs to access the core network of the second type; and
determining the target core network to be accessed in accordance with the third indication information and the second indication information in the information about the target PLMN,
wherein the determining the target core network to be accessed in accordance with the third indication information and the second indication information in the information about the target PLMN comprises:
when the third indication information indicates that the UE needs to access the core network of the second type, determining that the target core network is the core network of the second type; and
when the third indication information indicates that the UE does not need to access the core network of the second type and second indication information indicates that the target PLMN also supports the core network of the first type, determining that the target core network is the core network of the first type.

2. The core network accessing method according to claim 1, wherein the transmitting the PLMN indication information about the base station to the UE comprises:
transmitting a first PLMN list and a second PLMN list to the UE, wherein the first PLMN list comprises the PLMNs connected to the core network of the first type, and the second PLMN list comprises the PLMNs connected to the core network of the second type.

3. The core network accessing method according to claim 1, wherein the transmitting the PLMN indication information about the base station to the UE comprises:
transmitting a third PLMN list, first indication information about the third PLMN list, and a fourth PLMN list to the UE, wherein the third PLMN list comprises PLMNs merely connected to the core network of the first type and PLMNs connected to both the core network of the first type and the core network of the second type, the first indication information is used to indicate whether each PLMN in the third PLMN list is connected to the core network of the second type, and the fourth PLMN list comprises PLMNs merely connected to the core network of the second type.

4. The core network accessing method according to claim 1, wherein the PLMN indication information further comprises preferential core network indication information indicating a preferential core network for each PLMN connected to the core network of the first type and the core network of the second type, and the preferential core network is the core network of the first type or the core network of the second type.

5. The core network accessing method according to claim 1, wherein the PLMN indication information further comprises a Tracking Area Code (TAC) for each PLMN and/or a cell Identity (ID) for each PLMN.

6. The core network accessing method according to claim 1, further comprising:
receiving information about a preferential PLMN supported by the UE and a preferential core network from the UE, the preferential core network being the core network of the first type or the core network of the second type; and
when the UE moves out of a coverage of the base station, selecting, by the base station, a target base station supporting the preferential PLMN and the preferential core network, and notifying the target base station to configure resources for the UE, so as to enable the UE to be connected to the target base station.

7. A core network accessing method, comprising:
receiving Public Land Mobile Network (PLMN) indication information about a base station from the base station, the PLMN indication information comprising information about PLMNs connected to a core network of a first type and information about PLMNs connected to a core network of a second type;
selecting a target PLMN matching a User Equipment (UE) in accordance with the PLMN indication information; and
transmitting information about the target PLMN to the base station,
wherein when the target PLMN is connected to both the core network of the first type and the core network of the second type, the information about the target PLMN comprises second indication information indicating that the target PLMN is connected to the core network of the first type and the core network of the second type,
wherein the transmitting the information about the target PLMN to the base station comprises:
transmitting the information about the target PLMN comprising the second indication information and third indication information indicating whether the UE needs to access the core network of the second type to the base station,
wherein when the third indication information indicates that the UE needs to access the core network of the second type, the target core network is the core network of the second type; and
when the third indication information indicates that the UE does not need to access the core network of the second type and second indication information indicates that the target PLMN also supports the core network of the first type, the target core network is the core network of the first type.

8. The core network accessing method according to claim 7, wherein the receiving the PLMN indication information about the base station from the base station comprises:
receiving a first PLMN list and a second PLMN list from the base station, wherein the first PLMN list comprises the PLMNs connected to the core network of the first type, and the second PLMN list comprises the PLMNs connected to the core network of the second type.

9. The core network accessing method according to claim 7, wherein the receiving the PLMN indication information about the base station from the base station comprises:
receiving a third PLMN list, first indication information about the third PLMN list, and a fourth PLMN list from the base station,
wherein the third PLMN list comprises PLMNs merely connected to the core network of the first type and PLMNs connected to both the core network of the first type and the core network of the second type, the first indication information is used to indicate whether each PLMN in the third PLMN list is connected to the core network of the second type, and the fourth PLMN list comprises PLMNs merely connected to the core network of the second type.

10. The core network accessing method according to claim 7, wherein the PLMN indication information further comprises preferential core network indication information indicating a preferential core network for each PLMN connected to the core network of the first type and the core network of the second type, and the preferential core network is the core network of the first type or the core network of the second type.

11. The core network accessing method according to claim 7, wherein the PLMN indication information further comprises a Tracking Area Code (TAC) for each PLMN and/or a cell Identity (ID) for each PLMN.

12. The core network accessing method according to claim 7, further comprising:
reporting information about a preferential PLMN supported by the UE and a preferential core network to the base station, so that when the UE moves out of a coverage of the base station, the base station selects a target base station supporting the preferential PLMN and the preferential core network, and notifies the target base station to configure resources for the UE, so as to enable the UE to be connected to the target base station, wherein the preferential core network is the core network of the first type or the core network of the second type.

13. A base station, comprising a first memory, a first processor, and a computer program stored in the first memory and executed by the first processor, wherein the first processor is configured to execute the computer program so as to perform the following steps:
transmitting Public Land Mobile Network (PLMN) indication information about the base station to a User Equipment (UE), the PLMN indication information comprising information about PLMNs connected to a core network of a first type and information about PLMNs connected to a core network of a second type;
receiving information about a target PLMN selected by the UE in accordance with the PLMN indication information and matching the UE, and determining a target core network to be accessed in accordance with the information about the target PLMN; and
interacting with the target core network and the UE, so as to enable the UE to access the target core network via the target PLMN,
wherein when the target PLMN is connected to both the core network of the first type and the core network of the second type, the information about the target PLMN comprises second indication information indicating that the target PLMN is connected to the core network of the first type and the core network of the second type,
wherein the receiving the information about the target PLMN selected by the UE in accordance with the PLMN indication information and matching the UE and determining the target core network to be accessed in accordance with the information about the target PLMN comprises:

receiving the information about the target PLMN selected by the UE in accordance with the PLMN indication information and matching the UE, and third indication information indicating whether the UE needs to access the core network of the second type; and determining the target core network to be accessed in accordance with the third indication information and the second indication information in the information about the target PLMN, wherein the determining the target core network to be accessed in accordance with the third indication information and the second indication information in the information about the target PLMN comprises:

when the third indication information indicates that the UE needs to access the core network of the second type, determining that the target core network is the core network of the second type; and when the third indication information indicates that the UE does not need to access the core network of the second type and second indication information indicates that the target PLMN also supports the core network of the first type, determining that the target core network is the core network of the first type.

14. The base station according to claim 13, wherein the PLMN indication information further comprises preferential core network indication information indicating a preferential core network for each PLMN connected to the core network of the first type and the core network of the second type, and the preferential core network is the core network of the first type or the core network of the second type.

15. The base station according to claim 13, wherein the first processor is configured to execute the computer program so as to further perform the following steps:

receiving information about a preferential PLMN supported by the UE and a preferential core network from the UE, the preferential core network being the core network of the first type or the core network of the second type; and when the UE moves out of a coverage of the base station, selecting, by the base station, a target base station supporting the preferential PLMN and the preferential core network, and notifying the target base station to configure resources for the UE, so as to enable the UE to be connected to the target base station.

16. A User Equipment (UE), comprising a second memory, a second processor, and a computer program stored in the second memory and executed by the second processor, wherein the second processor is configured to execute the computer program so as to perform the core network accessing method according to claim 7.

17. The UE according to claim 16, wherein the PLMN indication information further comprises preferential core network indication information indicating a preferential core network for each PLMN connected to the core network of the first type and the core network of the second type, and the preferential core network is the core network of the first type or the core network of the second type.

18. The UE according to claim 16, wherein the second processor is configured to execute the computer program so as to further perform the following steps:

reporting information about a preferential PLMN supported by the UE and a preferential core network to the base station, so that when the UE moves out of a coverage of the base station, the base station selects a target base station supporting the preferential PLMN and the preferential core network, and notifies the target base station to configure resources for the UE, so as to enable the UE to be connected to the target base station, wherein the preferential core network is the core network of the first type or the core network of the second type.

* * * * *